United States Patent
Lakshminarasimhan Kanchi

(10) Patent No.: US 7,685,230 B2
(45) Date of Patent: Mar. 23, 2010

(54) SYSTEM AND METHOD FOR PROGRAM EXECUTION

(75) Inventor: Muralidharan Lakshminarasimhan Kanchi, Bangalore (IN)

(73) Assignee: Vaakya Technologies Private Limited, Bangalore, Karnataka (IN)

( * ) Notice: Subject to any disclaimer, the term of this patent is extended or adjusted under 35 U.S.C. 154(b) by 1240 days.

(21) Appl. No.: 10/816,493

(22) Filed: Apr. 1, 2004

(65) Prior Publication Data
US 2005/0223356 A1    Oct. 6, 2005

(51) Int. Cl.
*G06F 15/16* (2006.01)

(52) U.S. Cl. .......... 709/203; 709/219; 709/221; 709/246; 717/168; 717/174

(58) Field of Classification Search .......... 709/203, 709/212, 219, 229, 246, 248, 202, 217, 230, 709/221; 717/107, 115, 121, 171, 168, 174
See application file for complete search history.

(56) References Cited

U.S. PATENT DOCUMENTS

| | | | | |
|---|---|---|---|---|
| 5,898,835 A * | 4/1999 | Truong | | 709/217 |
| 5,991,802 A * | 11/1999 | Allard et al. | | 709/219 |
| 6,029,196 A * | 2/2000 | Lenz | | 709/221 |
| 6,167,567 A * | 12/2000 | Chiles et al. | | 717/173 |
| 6,493,871 B1 * | 12/2002 | McGuire et al. | | 717/173 |
| 6,651,087 B1 * | 11/2003 | Dennis | | 709/206 |
| 6,681,386 B1 * | 1/2004 | Amin et al. | | 717/136 |
| 6,839,731 B2 * | 1/2005 | Alexander et al. | | 709/201 |
| 6,854,112 B2 * | 2/2005 | Crespo et al. | | 717/174 |
| 2002/0004824 A1 * | 1/2002 | Cuan et al. | | 709/208 |
| 2002/0112049 A1 * | 8/2002 | Elnozahy et al. | | 709/224 |
| 2003/0023754 A1 * | 1/2003 | Eichstadt et al. | | 709/246 |
| 2003/0046662 A1 * | 3/2003 | Matsunaga | | 717/115 |
| 2003/0110241 A1 * | 6/2003 | Cheng et al. | | 709/221 |
| 2004/0015537 A1 * | 1/2004 | Doerksen et al. | | 709/203 |
| 2005/0223356 A1 * | 10/2005 | Kanchi | | 717/115 |
| 2006/0259592 A1 * | 11/2006 | Angeline | | 709/219 |
| 2007/0143392 A1 * | 6/2007 | Choe et al. | | 709/203 |

* cited by examiner

*Primary Examiner*—Michael Won
(74) *Attorney, Agent, or Firm*—Prakash Nama; Global IP Services, PLLC

(57) ABSTRACT

The invention pertains to a method and system that uses similar functionalities of different components within a software application when executing the application and application components. In one embodiment, predefined structures are created for a component type, where each component type has a similar functionality when executed. Parameter information is received at a client and linked with the predefined to provide a script specific predefined structure. The component is executed by executing the script specific predefined structure. After a user exits the component, the script specific predefined structure is automatically deleted.

17 Claims, 7 Drawing Sheets

SYSTEM AND METHOD FOR PROGRAM EXECUTION

BACKGROUND OF THE INVENTION

1. Field of the Invention

The invention relates generally to the field of software programs. In particular, the invention relates to a system and method for executing a component of a program.

2. Background of the Invention

There are several methods and systems used to execute programs in both the client-server and stand alone environments. All have several shortcomings, such as platform dependence problems, burdening the server and the network bandwidth, garbage collection, fault tolerances, slow execution speed and other problems.

In some client/server environments, a client is designed to be small so that most of the data processing takes place on the server. These clients are typically referred to as thin clients, and they are advocated by organizations such as Netscape and Sun Microsystems who support Java-based thin clients running on network computers. On the other hand, Microsoft and Intel are pushing larger applications that are run locally on desktop computers.

Software programs are typically developed using one of many high-level languages such as C, Java, C#, VB, Perl, and the like. The source code is compiled into machine code, which the processor can understand and use to execute a program. Generally, programs are compiled and executed using three different methods. High-level language is compiled into machine code by either compiling the program into: (a) a platform dependent executable ('exe') or a dynamic link library ('dlll'); (b) a platform independent byte code that is executed by a virtual machine; or, (c) is interpreted and executed line by line.

The choice of which high-level language and method of program execution to utilize while preparing a software program depends on many factors, such as the ease of development, component reusability, ease of maintenance (which pertains to platform dependence) and faster program execution with minimum resources (which implicate memory and network bandwidth burdens). The scripting language and byte code options are typically used for ease of program maintenance (operating system and processor independence) rather than speed of execution.

Programs written in the C/C++ language form a machine-readable, platform dependent executable when compiled. In the client-server environment, when a user at the client desires to execute a program, the client sends a request to the server and the entire executable is transferred to the client, i.e., a copy of the executable is transferred from a server to the client and executed on the client computer. This involves the use of substantial network bandwidth for sending information back and forth between the client and the server computer. Although most of the processing is done at the client computer, the information required needs to be sent on an ongoing basis.

Another shortcoming is the platform dependence of the program. A program compiled for a Windows operating system cannot be executed on a Linux operating system and vice-y-versa. As a result, the server maintains multiple versions of the executable to service clients running different operating systems.

Sun created Java to address several of these shortcomings. Programs written in Java are platform independent. The Java compiler converts the Java source code to byte code, which is understood by the Java Virtual Machine (JVM). The JVM is platform dependent and translates the program to machine-readable form for execution. The byte code, however, is dense and must be transmitted from the server to the client, thus causing network bandwidth clutter. Further, most of the programs written in Java are programmed such that the processing required is performed at the server computer. This limits the number of clients that can be serviced by the server at one time.

JavaScript and other similar languages are interpreted languages. In such languages, there is an interpreter at the client and the client receives the script in text form. The interpreter at the client interprets one or more lines at a time to execute the program. Because the actual text of the program script is sent, less network bandwidth is burdened than is burdened when C/C++ executables or Java byte code is sent. One reason why less bandwidth is burdened is because the executable and byte code files are denser. JavaScript programs, however, require the entire script to be sent from the server to the client. This unnecessarily clogs up network bandwidth because, in many cases, the entire script need not be transmitted.

In databases used in the client-server environment, such as SQL and Oracle databases, the client sends queries to the server, which sends the requested information to the client. The intelligence required to display the information resides at the client and, hence, some processing relating to user interfaces is performed at the client computer. If expressions need to be solved, however, the server needs to be contacted. In such cases, the server retrieves the information from the database, calculates the result of the expression and sends back the information to the client. This requires the server processor to calculate the result and, thus, slows down and limits the other clients being serviced at the server.

When servers need to undergo regular maintenance procedures, crash or malfunction, the clients are disconnected and can only access the server once the server has been fixed. This problem particularly affects small companies because smaller companies cannot afford multiple servers to transfer client load while malfunctioning server computers are being fixed.

Garbage collection is another problem in the industry in standalone as well as client-server environments. Memory allocated in the Random Access Memory (RAM) needs to de-allocated after use to avoid cluttering the memory. When programs are written in the C/C++ language, programmers must manually deallocate the memory. Programmers use a "malloc" command to allocate space and a de-allocate command to free space. Programmers, however, often times neglect to deallocate memory space when writing software programs, resulting in memory clutter.

Java attempted to address this problem in its JVM. The JVM keeps track of memory that has not been referenced over a period of time and automatically de-allocates that memory. The device with the JVM, however, must incorporate precious processing power to constantly search for and delete the non-referenced objects. Further, the non-referenced objects use up precious memory while not in use and stored in the memory.

There remains a need to address the problems associated with executing programs, such as, network bandwidth and server processing burdens, platform independence, garbage collection, fault tolerances as well as others.

BRIEF DESCRIPTION OF THE DRAWINGS

Many of the objects and advantages of the present invention will become apparent to those of ordinary skill in the relevant art after reviewing the following detailed description and accompanying drawings, wherein.

DETAILED DESCRIPTION OF THE INVENTION

Figure 1:
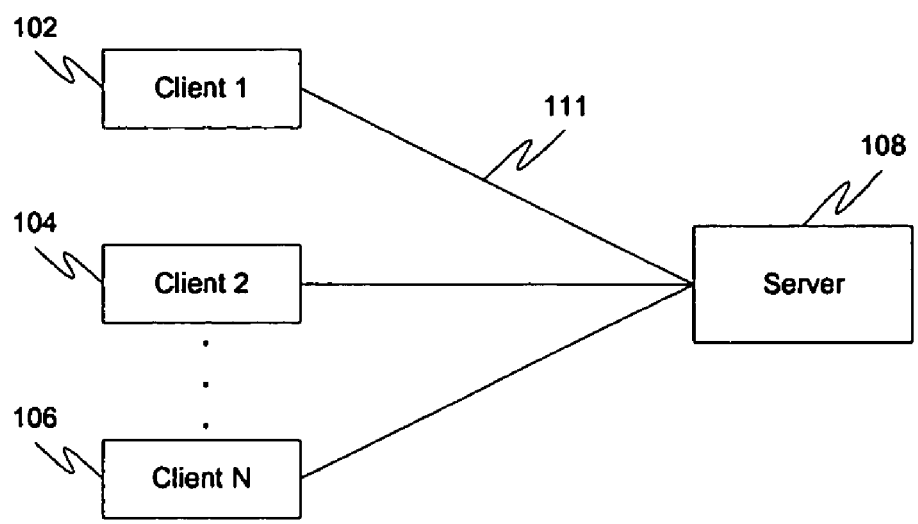
FIG. 1 shows a block diagram of an embodiment of the invention in a client-server environment.

The present invention may be embodied in several forms, structures and manners. The description provided below and the drawings show an exemplary embodiment of the invention in the client-server environment. Those of skill in the art will appreciate that the invention may be embodied in other forms, structures and manners not shown below, including the stand alone environment. The invention shall have the full scope of the claims and is not to be limited by the embodiments shown below.

The present invention generally pertains to methods and systems to execute programs and program components. Many components of either one program or several programs have the same intended functionality, i.e., the functionality of the component when executed. For example, when a form is executed, the form has a functionality of having a graphical user interface, fields for data entry, buttons linking the form with other forms or components, interrelationship information showing how data entered into a form affects other forms or components, and expression solving capabilities to compute an expression. Most forms have the same intended functionality. Many components of either one program or several programs have the same intended functionality.

According to an embodiment of the invention, a predefined structure (PDS) is created that has the intended functionality of one of several component types. Thus, in the form example, the PDS includes a generic structure that includes the intended functionality of a user interface, fields, buttons, interrelationships, and expressions.

In one embodiment of the invention, PDSs are stored in a memory at a client, and in other embodiments, the PDSs are stored at both the client and a server. A client may request a specific component from a server so that the user can run the component, for example, run a form for a business program. In one embodiment, the server sends only the parameter information about the component to the client. Parameter information includes, for example, specific information about the particular component that the client intends to run. In the form example for instance, the parameter information may include specific information about user interfaces, field names and types, links between the form and other forms and to previously entered user data to be inserted into fields within the form, interrelationship information showing how data entered into the form affects data in another form, e.g., for instance information showing how a cost form affects data in a different profit form, and expression solving information, e.g., for instance information to instruct a processor to sum up several sub-costs to calculate a total cost.

The user receives this information at the client and links it to the corresponding predefined structure to provide a script specific predefined structure, and the client executes the script specific predefined structure. Because all of the intended functionalities of the form are stored at the client memory as a PDS, only the parameter information need be transmitted to the client for processing at the client. By transmitting only the parameter information in script format, much network bandwidth is saved as compared to sending more dense byte or machine code or to sending the entire script, which includes the basic structure of the form.

In another embodiment, the client automatically deletes the component after the user exits the component. For example, after the user closes the component. As a result, improved memory utilization is achieved and problems associated with garbage collection are alleviated. Other systems either require a programmer to manually include commands to deallocate memory for each program that is run on a system or require a processor to periodically scan memory and delete unused components. Programmer neglect and the periodic scanning result in memory clutter and processing power wastage.

FIG. 1 shows one embodiment of the invention in a client-server environment. Each client 102, 104, 106 is in communication with a server 108 through a communication network 111, which may be, for example, a wide area network such as the internet, a local area network, or a wireless network including base and mobile stations.

Figures 1A, 1B:
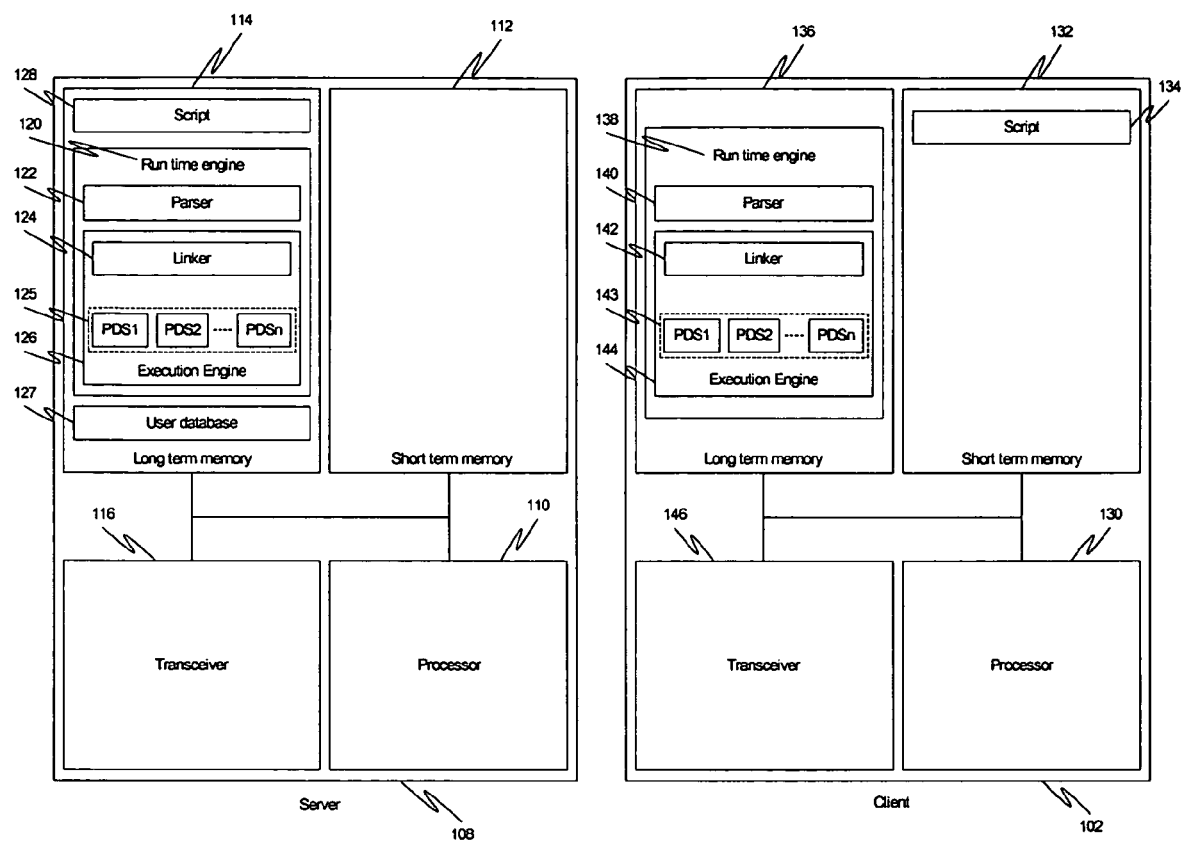
FIG. 1a shows a block diagram of the server shown in FIG. 1.
FIG. 1b shows a block diagram of the client shown in FIG. 1.

FIG. 1a shows the server 108 pursuant to an embodiment of the invention. In the embodiment of FIG. 1a, the server 108 comprises a computer having a long term memory 114, a short term memory 112, a processor 110 and a transceiver 116. The server's long term memory 114 stores data and may include a hard disk drive of a computer. In one embodiment, the server long term memory 114 includes program script 128, a user database 127, and a run time engine 120 stored therein. The runtime engine 120 includes a parser 122 and an execution engine 126, which comprises PDSs 125 and a linker 124. The short term memory 112 may comprise a random access memory of a computer, which is used when the program or program component is run by the server 108.

The processor 110 may comprise a microprocessor of a computer and is used to carry out several functions. The run time engine may instruct the processor 110 to carry out various procedures. In one embodiment, the server parser 122 instructs the processor 110 to search for a component requested by the client 102, and the server execution engine 126 instructs the server transceiver 116 to transmit the component script having parameter information to the client 102. In other embodiments, the server execution engine 126 also instructs the processor 110 to transmit to the client 102 the parameter information of previously entered user defined data that is associated with the requested component and stored in the user database 127. In alternate embodiments, the server linker 124 instructs the server processor 110 to link the component script to a PDS 125 to provide a script specific PDS; and, the server execution engine 126 instructs the server processor to temporarily store in the server short term memory 112 and execute the script specific PDS and to delete the script specific PDS after it is exited.

The server processor 110 also temporarily moves information, such as the run time engine 120, script 128 or data from the user database 127 from the long term 114 to the short term memory 112. The server's 108 transceiver 116 is used to transmit and receive information, such as transmitting script to the client and receiving requests from the user.

FIG. 1b shows a client pursuant to an embodiment of the invention. The client 102 may comprise, for example, a computer or a hand held device, such as a mobile phone or a personal digital assistant (PDA). The client 102 includes client long term 136 and short term memories 132, a client processor 130 and a client transceiver 146. The client long term memory 136 is configured to store information and may comprise a hard disk drive of a computer or a memory chip of a hand held device. The client long term memory 136 includes the run time engine 138 stored therein, and the run time engine 138 comprises a parser 140 and an execution engine 144, which comprises PDSs 143 and a linker 142. The client short term memory 132 may comprise a random access memory of a computer or a similar chip used in a hand held device. The client processor 130 comprises a chip of a computer or a hand held device, respectively.

In one embodiment, the client parser 140 instructs the client processor 130 to search for identifiers (explained below in greater detail) within component script and predefined structures 143, the client linker 142 instructs the client processor 130 to link parameter information of the requested component to a corresponding PDS 143 to provide a script specific PDS, and the client execution engine 144 instructs the client processor 130 to temporarily store in the client short term memory 132 and execute the script specific PDS. When the user exits the requested component, the client execution engine 144 instructs the client processor 130 to automatically delete the script specific PDS.

The client processor 130 may also be used to temporarily move information, such as the run time engine 138 from the long term 136 to the short term memory 132. The client transceiver 146 may be used to transmit and receive information, for example, to transmit requests to the server 108 and to receive script from the server 108.

The client run time engine 138 may be stored on either one of or both of the client and server. Thus, the run time engine 138 can be configured to behave as a client 102, server 108, or a peer to peer or offline application. As both the server 108 and the client 102 have the same amount of intelligence, they can swap roles as server or client. Swapping increases the fault tolerance of the system, and hence, if any machine malfunctions, other machines in the network can efficiently support the malfunctioning machine's workload without disturbing the system. In addition to fault tolerance, this architecture reduces network traffic because each machine is capable of performing its own processing. Thus, continuous communication between the client and the server may not be required.

Note that, although the invention is shown in a client-server environment in FIG. 1, the invention may be embodied in other forms. For example, the invention may be embodied in a stand alone computer that comprises long and short term memories and a processor. In other embodiments, the invention may be stored on any media, such as, for example, magnetic tape, discs, including magnetic and optical discs, and memory chips. The invention may then be loaded from the media onto other devices having processing capabilities, such as a computer or hand held devices.

Figure 2:
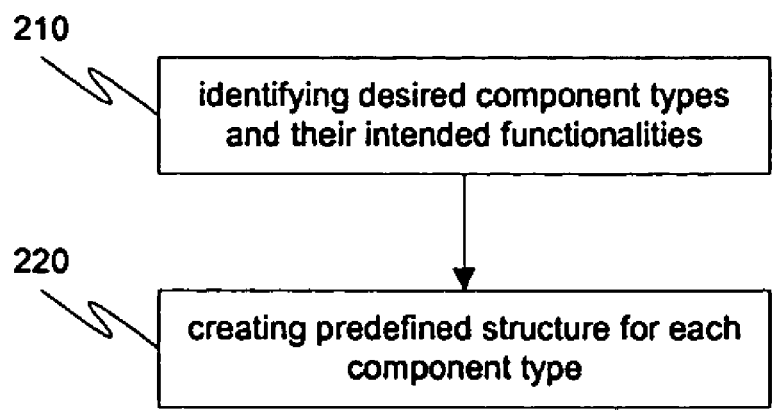
FIG. 2 shows a flow diagram of the steps for creating portions of the run time engine pursuant to an embodiment of the invention.

There is a PDS for each component type, and FIG. 2 shows an embodiment of the invention for creating PDSs. At step 210 the desired component types and their intended functionalities are identified. Most software programs comprise of several components, which comprise of one or more lines of script that, when executed, exhibit a particular functionality. The script may be in any programming language, for example, C, Fortran, Java, or, in a preferred embodiment of the invention, Vscript, which is described in greater detail below.

The components are divided into component types based on their intended functionalities, the functionality the components exhibit when executed; and, components are typically executed by a processor. Some component types that are found in programs include: programmer defined data types, programmer defined objects, form, view, report, programmer defined functions, menu and third party executables.

As explained above, each component has similar intended functionalities, such as how the user interface appears (where signs and symbols, for example, are located on the user interface), application models, such as the structure of the component and the interrelationships between the component and other components, and expression solving capabilities. For example, most forms exhibit one or more of the following functionalities when executed: having a graphical user interface, fields for data entry, buttons linking the form with other forms or components, interrelationship information showing how data entered into the form affects other forms or components, and expression solving capabilities to compute an expression. A menu component type, for example, exhibits a particular graphical display, includes drop down menus, and drop down menu selections, for linking to various other component types, when executed. Those of skill in the art will appreciate that there are other component types having other intended functionalities, and these other component types are within the scope of the invention.

At step 220, a PDS is created for each component type. The PDS comprises script that is written so that it has the intended functionality of its corresponding component type. Thus, the configuration of the PDS is dependent on its corresponding component type. Examples of PDSs for form and menu component types are provided below and are written in the C programming language. Note, however, that, in other embodiments, PDSs may be written in other languages, such as, for example, Fortran, Java and the like. Note also that PDSs are stored in machine code at the client and/or server. The PDSs are precompiled according to the particular operating system and type of processor used at the client or server where the PDS is loaded. Thus, the parameter information that is sent to the client is platform independent and different types of script or code are not needed for different operating systems or processors.

A PDS for a form should have the intended functionality of the form. In the embodiment shown below, the form PDS includes a generic title portion (labeled "struct tag_VQL_FormInfo" below), a generic structure portion (labeled "struct tag_VQL_Form" below), a field structure portion (labeled "struct tag_VQL_FieldInfo" below), a foreign link portion (labeled "struct tag_VQL_ForeignLink" below), a grid structure portion (labeled "struct tag_VQL_Grid" below), and a grid field property portion (labeled "struct tag_VQL_BoundInfo" below). These portions include the intended functionality of the form. Note that the form PDS shown below includes arrows to particular lines within the PDS. The arrows show where script for a particular form will be inserted into the PDS when the PDS is linked to a component. An example of the form script from one program will be provided and the linking process will be explained.

The generic title portion of the form PDS includes information showing how the title of the form should appear, and an example of such a title portion is shown below. The PDS script pertaining to title and object information is marked below by arrows. Further, the title, as provided in the form script (Script 9) is shown. This and/or other form structures can be extended to capture additional properties of the form like screen size, display co-ordinates, background color, fonts to be used in all of the labels and fields in the form and the like. This information is used during the linking step explained below in greater detail.

```
struct tag_VQL_FormInfo
{
    VosText *menuLink;
    VqlSpec *vsForm;
    VosText *formTitle;  <---- Form title
    VosText *objName;    <----- TOKEN Object
    VosText *lblFontName;
    VosInt  lblFontSize;
    VosText *inpFontName;
    VosText inpFontSize;
};
```

Form PDS, Title Portion—SCRIPT 1

The generic structure portion of the form PDS includes information about widgets, grid names and other information, and an example of such a generic structure portion is shown below. The PDS script showing information about the spacing between the list of fields and how the fields are used in the form is marked below by arrows.

```
struct tag_VQL_Form
{
    VosBool         remoteExec;
    void            *appContext;    // VqlApp or VqlClient
    VqlDict         *objDict;
    VqlTblInfo      *vti;
    VosText         *recBuffer;
    VosSize         maxGrids;
    VqlGrid         *grids[VQL_MAX_FORM_GRIDS];
    SgiQuery        *query;
    SgiFont         *lblFont;
    SgiFont         *inpFont;
    VosText         *keyField;
    VosList         *widgetList; <- list of fields
    VosEnum         entryMode;   <- append, update, delete
    VosInt          error;
    VdbRcdId        prevDataPos;
    VosList         *foreignLinks;
    VqlFieldSet     formFields;
    SgiWidget       *delButton;
    SgiWidget       *keyWidget;
    VosLookup       *vqlLookups;
};
```

Form PDS, Generic Structure Portion—Script 2

The field structure portion of the form PDS includes information about each field within the form, and an example of such a field structure portion is shown below. The PDS script showing information about the name, identification and size of fields used within the form is marked below by arrows. Further, the name, identification and size of a field, as provided in the form script (Script 9) is shown. This information is used during the linking step explained below in greater detail.

```
struct tag_VQL_FieldInfo
{
    VosEnum         fldType;
    VqlColSpec      *vqc;
```
-continued
```
    VosText         *label;     <---- Bill NO
    VosText         *fldName;   <---- TokenId
    VosText         *linkName;
    VqlTblInfo      *vti;
    VosEnum         vdtType;
    VosText         *recBuffer;
    VosSize         offset;
    VosSize         colSize;    <----- 06
    VosSize         maxChars;
    VosSize         visChars;
    VosSize         precision;
    VqlForeignLink  *helpLink;
    VqlForeignLink  *srcLink;
    VqlBoundInfo    boundInfo;
    SgiLabelSpace   *lblSpace;
    VosText         *blanks;
    VqlForm         *parentForm; <----- tokform_clinic
};
```

Form PDS, Field Structure Portion—Script 3

If a form includes a link to another component, it will have a foreign link and, pursuant to an embodiment of the invention, there will be a foreign link portion of the form PDS, which includes information about links from the form to other components. An example of such a foreign link portion is shown below.

```
struct tag_VQL_ForeignLink
{
    VqlTblInfo *vti;
    VdbHelp    *help;
    VdbFormat  *keyFormatter;
    VosText    *keySource;
    VosText    *helpKey;
    VosText    *recBuffer;
    VosEnum    vdtType;
    VosSize    offset;
    VosSize    colSize;
};
```

Form PDS, Foreign Link Portion—Script 4

If a form includes a grid, pursuant to an embodiment of the invention, there will be a grid structure portion of the form PDS, which includes information about the size of the grid in rows and columns and other grid information. An example of such a grid structure portion is shown below.

```
struct tag_VQL_Grid
{
    VosText      *alias;
    VosSize      maxRows, maxColumns, loadedRecords;
    VosSize      curRow, curCol;
    VqlTblInfo   *vti;
    VosText      *recBuffer;
    VdbRecset    *vrs;
    VqlFieldSet  gridFields;
    VqlFieldInfo *vfiCheck;
    SgiWidget    *inpGrid;
    VosText      *curRowData;
    VqlForm      *parent;
};
```

Form PDS, Grid Structure Portion—Script 5

If a form includes a grid, pursuant to an embodiment of the invention, there will be a grid field structure portion of the form PDS, which includes information about the fields within a grid, such as the field and column ids and column sizes. An example of such a grid structure portion is shown below.

```
struct tag__VQL__BoundInfo
{
    VosBool      exists;
    VosEnum      funcId; // Aggregate Function
    VosSize      gridId;
    VosSize      columnId;
    VqlTblInfo   *vti;
    VosText      *recBuffer;
    VosEnum      vdtType;
    VosSize      offset;
    VosSize      colSize;
    VqlExpSolver *solver;
};
```

Form PDS, Grid Field Structure Portion—Script 6

Thus, in the embodiment shown above, the form PDS includes the intended functionality of the form, such as information about how the title looks when displayed, how the graphical display of the form would appear when the form is executed, information pertaining to fields within the form, if a link (or button) on the form is present, information about what the link connects the form to and information of how data entered into the form might affect other forms or components, and, if the form includes a grid, information about the grid and fields within the grid.

A PDS for a menu should have the intended functionality of a menu. In the embodiment shown below, the menu PDS includes a menu structure portion (labeled "sruct tag_VQL_MenuInfo" below). The menu structure portion includes information about the menu graphical display, drop down menus, and the links the drop down menus include.

In embodiments of the invention, the run time engine 120, 138 are kept in media and loaded into a device that includes a processor 110, 130. The processor 110, 130 of the device links the PDSs 125, 143 with parameter information to provide script specific PDSs and executes the script specific PDSs. In other embodiments, the processor would also temporarily store the script specific PDS and automatically delete the script specific PDS after the user exits the component.

Figure 3:
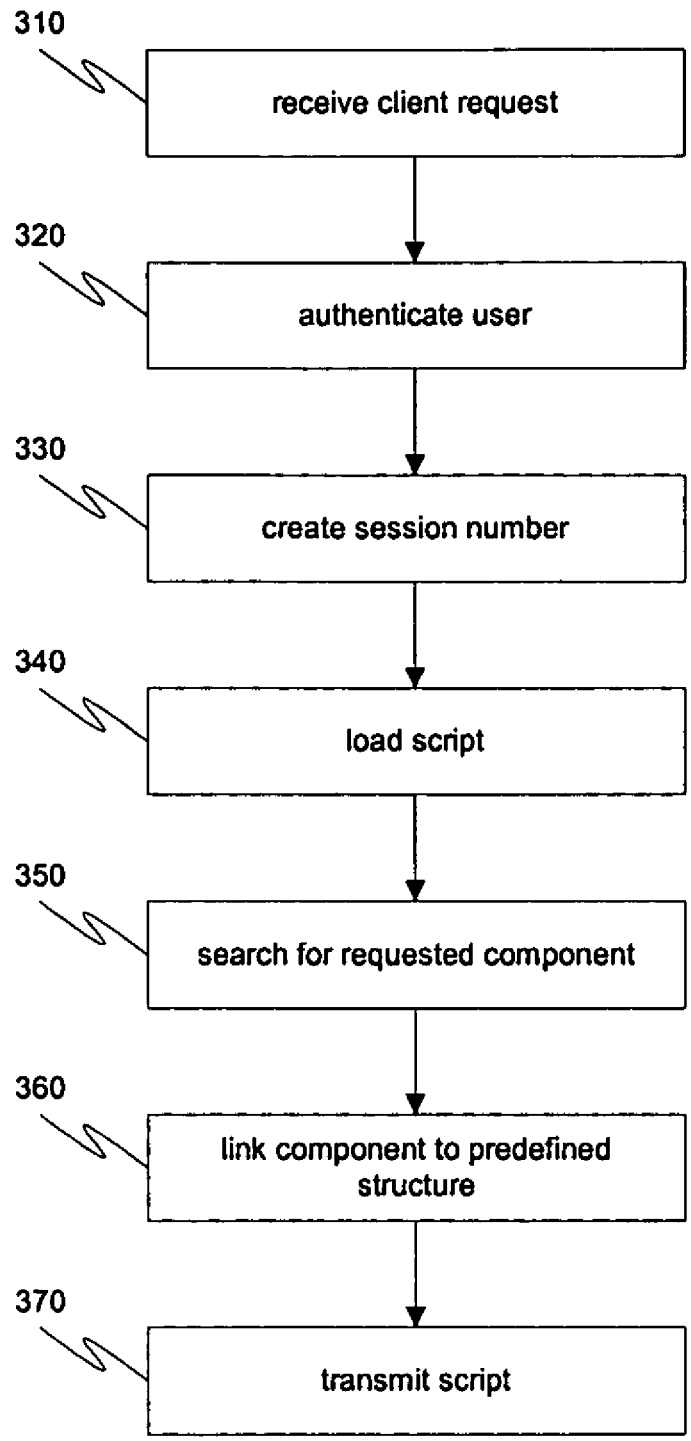
FIG. 3 shows a flow diagram of the steps performed by a server in an embodiment of the invention.

Pursuant to an embodiment of the invention, PDSs are linked to corresponding component script by either or both the server 108 and the client 102, or in other embodiments, just the stand alone computer. FIG. 3 shows an embodiment of a server 108 sending script to a client 102 in response to a client request.

At step 310, the server 108 receives a client request for a program. Typically, the server 108 transceiver receives a request transmitted by the client transceiver 146. At step 320, the server 108 authenticates the user 315 based on a user access level. The server processor 110 may compare user identification and password information transmitted by the user with access level information stored in the user database. Other ways of user identification include biometrics, hardware locks and the like.

At step 330, a session number is created. Session numbers are often used in WAN environments, such as the world wide web. The session number identifies a particular communication between the client and the server. Identifying the communication allows either the client or the server to refer back to the communication at a later time and obviates the need for a specially reserved communication trunk in many instances. Pursuant to an aspect of the invention, the use of a session number is applied to LAN environments and assists client-server session management by facilitating the use of the connectionless communication protocol.

At step 340, the server 108 loads program script according to the user request. In one embodiment, the server processor 110 transfers the program script 128 from the long term memory 114 to the short term memory 112. At step 350, the server 108 searches for the appropriate component. Per

```
struct tag__VQL__MenuInfo
{
    VosEnum   exeType;         // Form, Report, View
    VosEnum   vqlCommand;
    VosEnum   uidMenu;
    VosText   *linkName;       // Name of component to be executed
    void      *exeLink;        // Arguments if any before activating the component
    VqlArgSet *reqArgs;        // Transmit to Client, Arguments required for exec
};
```

Menu PDS, Menu Structure Portion—Script 7

Thus, the PDSs above include information about how the user interface appears (where signs and symbols, for example, are located on the user interface), application models, such as the structure of the component and the interrelationships between the component and other components, and expression solving. Those of skill in the art will appreciate that, although two PDS examples are provided above and although a limited number of component types are provided above, the invention is applicable to other component types having different functionalities; and to other PDSs created to include the intended functionalities of the other component types and to the corresponding execution engines.

instructions from the server parser 122, the server processor 110 transfers the run time engine 120 from the long term 114 to the short term 112 memory and searches for the appropriate component in the script. In other embodiments, if previously entered user data is referred to in the appropriate component, the server processor retrieves the previously entered user data from the user database 127. Typically, the first component searched for is a menu that is sent to the client. Other components may also be searched for depending on the client request. Examples of menu and form script in the VScript language are provided below.

In alternate embodiments of the invention, the PDSs 125, 143 are linked to parameter information to provide a script specific predefined structure at the server, for testing or other purposes; in such cases, the server execution engine 126 may also instruct the server processor to execute the script specific predefined structure. In the alternate embodiment, at step 360, the components are linked to their corresponding PDSs that have the same functionality as the components to provide script specific PDSs. Per instructions from the server linker 124, the server processor 110 links the parameter information, including any relevant previously entered user data from the user database 127 and component scripts 128, to the PDS. (The linking process is the same at the server and the client and is discussed in greater detail below.)

At step 370, the appropriate script is transmitted to the client 102, typically by the server processor 110 and transceivers 116. Note that, in the examples provided above, the script of the actual components is written in Vscript, which is a script created for use with run time engines 120, 138 of the invention. VScript is used because VScript allows for components to be written with less script than would be required to write the components with other programming languages. As a result, the amount of script that is transmitted from the server to the client is reduced, and the invention may be embodied in a larger variety of servers 108, clients 102, 104, 106 and communication networks. It is believed that, in other embodiments of the invention, other programming languages may be used for the components, including C language, Fortran, Java and other languages.

Figure 4:
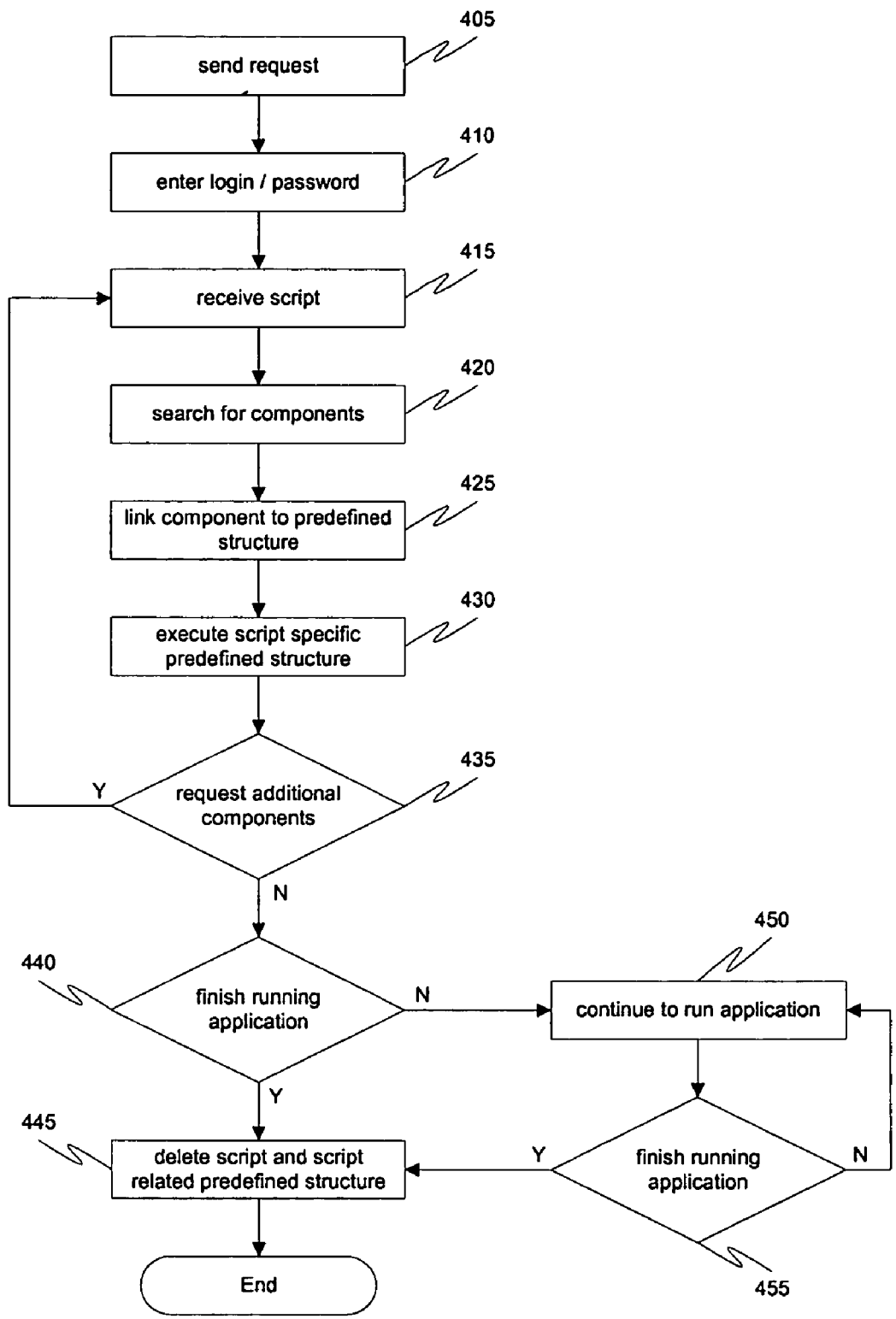
FIG. 4 shows a flow diagram of the steps performed by a client in an embodiment of the invention.

In one embodiment of the invention, the client sends a request to the server 108 that prompts the server to send component script including the parameter information and other parameter information, such as relevant, previously entered user data to the client 102. The client searches for an identifier (described below) within the script, links the component to a PDS 143 to form a script specific PDS, and executes the script specific PDS, as shown in FIG. 4.

At step 405, the client 102 transmits a request to the server 108, typically by the client processor 110 forming a request and the client transceiver 146 transmitting the request to the server 108. As provided above, the server 108 verifies the client's access level by requesting the user to enter access information, and at step 410, the user enters user access information, which can be, for example, user identification and password information. The server 108 then sends the requested component script 128 that includes the parameter information about the component and the parameter information of any relevant, previously entered user data that is referred to in the component script to the user at step 415.

An example of a menu component script showing information about the particular menu's drop down menus and links within the drop down menu is provided below:

```
#DEFINE_MENU
{
    #SET MENU.FONT = arial, 18
    #DEFINE.Group = &Masters
    {
        docForm as &Doctor (CTRL_I+SHIFT_X)
        grpForm as Test &Group
        tstForm as &Test
    }
    #DEFINE.Group = &Reports
    {
        docView as List of &Doctors
        grpView as List of Test &Groups
        tstView as &Test
    }
    #DEFINE.Group = &Maintenance
    {
```

-continued

```
        VQL.REINDEX as Reindex
        VQL.COMPACT as &Compact
        VQL.TRANSFER as Annual &Transfer
        VQL.ARCHIEVE as &Backup
        VQL.RESTORE as &Restore
    }
    Exit
}
```

Menu Component Script—Script 8

An example of a form component script showing information about the title of the form and various fields within the form is provided below:

```
#DEFINE.FORM as tokForm_Clinic
{
    #SET FORM.OBJECT = TOKEN
    #SET FORM.TITLE = TOKEN ISSUE
    TokenId AS Bill No (06), Date AS Date (d6)
    PatName AS Patient Name (48)
    PatAgeYear AS 'Age_Years' (6), PatAgeMonth AS Months (4),
    PatSex AS Sex (4)
    Nationality AS Nationality (15)
    DocName AS Doctors Name (48)
    #DEFINE.GRID as Q
    {
        #SET GRID.OBJECT = RESULT
        #SET GRID.MAX_ROWS = 32
        #SET GRID.VIS_ROWS = 4
        TestId AS TestId (04)
        TEST.TestName(TestId) AS Test Description (48.40)
        Charges = (TEST.Charges*5.0) AS Test Charges (10.2)
        GRID_ROW.TokenId = TOKEN.TokenId
        GRID_ROW.SerNum = ROW_ID
    }
    BillValue = #GRID.TOTAL(Q, 3) AS Bill Value (10.2);
}
```

Form Component Script—Script 9

The form shown in Script 9 includes several objects that are referred to within the form, such as the token and result objects. Exemplary script for the token and result objects is provided below (at Scripts 10 and 11):

```
Object definition for TOKEN
#Define.Object as TOKEN
{
    #define.Record
    {
        long    TokenId;       (LINK COUNTER)
        long    PatId;
        double  BillValue;
        double  Discount;
        double  PaidValue;
        short   TokenStatus;
        short   PatAgeYear;
        short   PatAgeMonth;
        short   DocId;
        short   TestId[64];    (LINK TEST.TestId)
        date6   Date[7];
        char    PatStatus[3];
        char    PatName[49];
        char    DocName[49];
        char    Nationality[16];
        char    PatSex[3];
    };
```

-continued

```
    #SET Object.Key = token, "TokenId(06)";
    #SET Object.Key = tokbydat, "Date(6) + TokenId(06)";
}
```

Token Object of Form Script—Script 10

```
#define.Object as RESULT
{
    #define.Record
    {
        long    TokenId;       (LINK TOKEN.TokenId)
        double  Charges;
        short   SerNum;
        short   TestId;        (LINK TEST.TestId)
        char    Data[43];
        char    DataEntered;
    };
    #SET Object.Key = result,"TokenId(06) + TestId(04) +
    SerNum(02)";
}
```

Result Object of Form Script—Script 11

At step 425, the script and PDSs are linked by the use of identifiers in the script and corresponding identifiers in the PDSs. For example, in the form script, "#SET FORM-.TITLE" is an identifier showing that the corresponding title of the form ("TOKEN ISSUE") should be placed adjacent to "*formTitle", which is the corresponding identifier in the form PDS. At step 420, the client 102 searches for identifiers within the transmitted parameter information. In one embodiment, the client processor 130 transfers the client run time engine 138 from the long term memory 136 to the short term memory 132, and the client parser 140 instructs the client processor 130 to search for the identifiers in the transmitted component script. The client parser 140 also instructs the client processor to search for any components that are linked to the requested component, and if so, requests those components from the server and proceeds to step 415; if not, the client proceeds to step 425.

At step 425, the parameter information 134, including the parameter information about the component and the parameter information of any relevant, previously accessed user data, is linked to the corresponding PDS 143 to provide a script specific PDS. In the examples provided above, the token script (and the related objects) (Scripts 9-11) would be linked to the appropriate token PDS (Scripts 1-6) to provide a form specific PDS.

Figure 5:
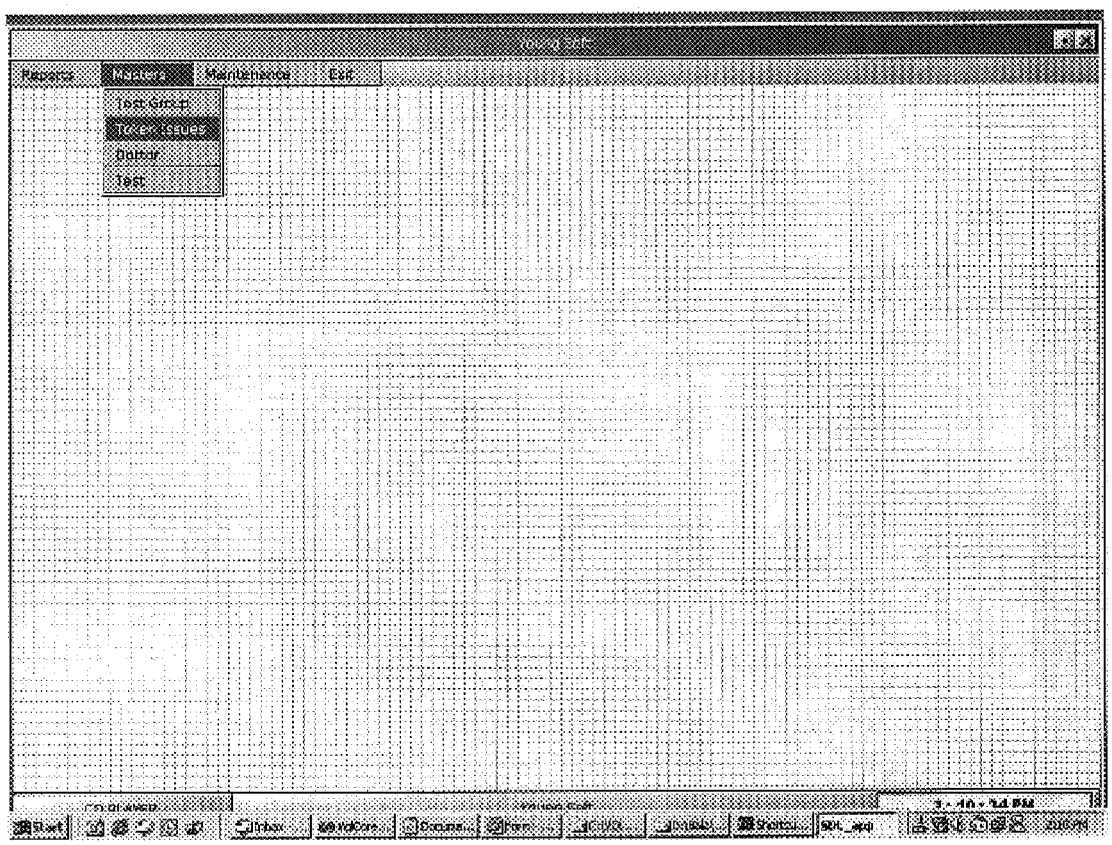
FIG. 5 shows the graphical display of a menu after a component menu has been executed according to an embodiment of the invention; and, FIG. 6 shows the graphical display of a form after a component form has been executed according to an embodiment of the invention.
Figure 6:
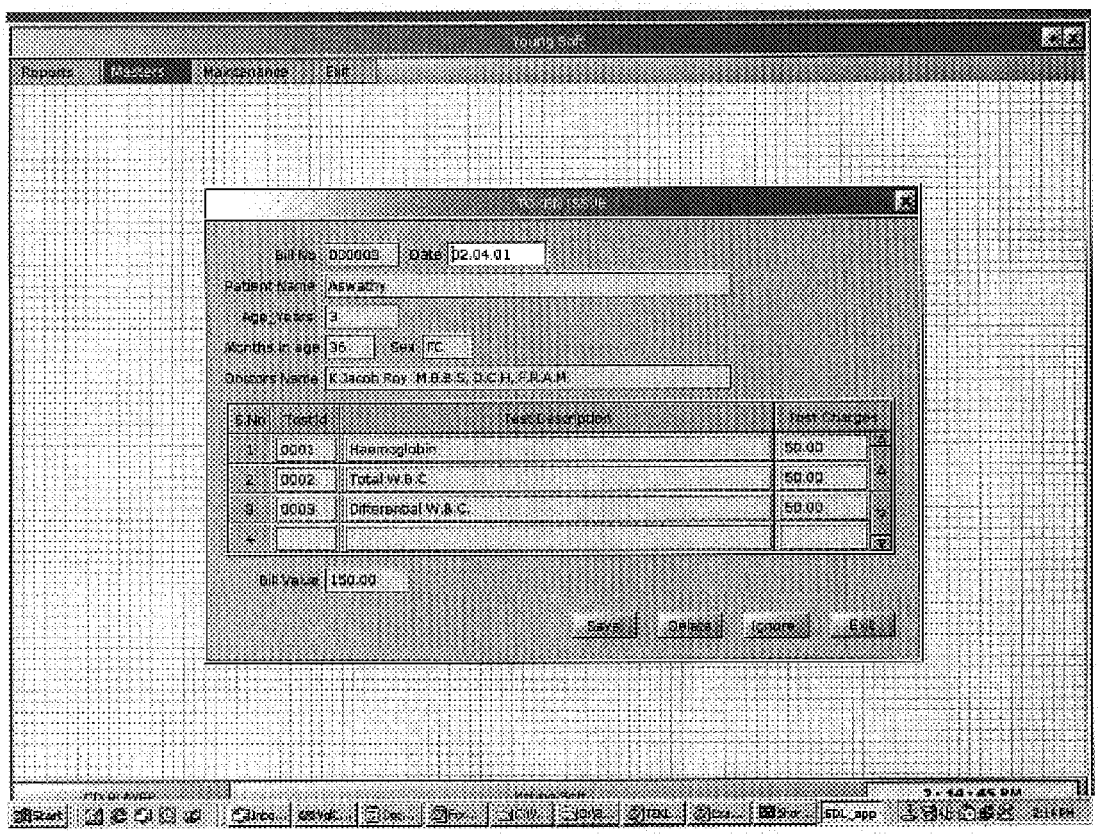

At step 430, the script specific PDS is executed. In one embodiment, the client execution engine 144 instructs the client processor 130 to execute the script specific PDS. Examples of the menu and form components executed by executing a menu script specific PDS and a form script specific PDS are shown in FIGS. 5 and 6, respectively.

As provided above, the PDS includes the intended functionality of how the component user interface appears and a graphical display mechanism of the PDS is utilized. In one embodiment of the invention, a coordinate graphical display mechanism is utilized in which the execution engine 144 reads coordinates adjacent to component script to discern where the execution engine 144 should display particular information of the script on a display.

In another embodiment of the invention, an automatic graphical display mechanism is utilized. For example, when displaying a form using the automatic graphical display mechanism, the execution engine 144 determines where to insert information depending on how the script is written. FIG. 6 shows an exemplary form executed by an execution engine 144 employing an automatic graphical display mechanism. When executing the token of Script 9, the execution engine 144 provides a "Bill No" field as the first field on the display in the top left hand corner because the "Bill No" is the first field provided in the script. This field is six characters long, as provided in Script 9. A "Date" field having 6 characters is placed next to the "Bill No" field because the "Date" field is on the same line as the "Bill No" field. A "Patient Name" field having 48 characters is placed on the next line because the "Patient Name" field is provided on the subsequent line, as provided in Script 9. The integrity of the script structure is preserved after the script is linked to the PDS so that an automatic graphical display mechanism may properly execute the component. Note that, in other embodiments, the automatic graphic display mechanism may be configured differently to meet the needs of other programs.

Also at step 430, the execution engine 144 instructs the client processor 130 to utilize the expression solver intended functionality of the PDS to solve any expressions in the component script when executing the component. The client 102 solves any expression in the script when executing the script. An example of an expression that would be solved by the expression solver is labeled "charges=(TEST.Charges*5.0)" in Script 9. In addition, at step 430, any interrelationships between the script specific PDS and other components are maintained based on the application model functionality of the PDS.

Because the PDS includes the intended functionalities regarding user interfaces, expression solving and application models, only parameter information need be transmitted from the server to the client. The component may be executed by combining the parameter information with the PDS to provide the script specific PDS and executing the script specific PDS. As a result, network bandwidth and server processing burdens are reduced. Prior systems required the server to either form the user interface, determine component structure, determine component interrelationships, or solve expressions, or perform all of such functions. Thus, either dense executable, dense byte code or unecessarily large source code files were transmitted across the network for component execution, and the systems were encumbered by network bandwidth and/or server processing strains.

In one of the embodiments of the invention, at step 435, the client 102 determines whether additional components are required, and if so, additional components are requested if they were not received at step 415. Steps 420 to 435 are then repeated. If additional components are not required, at step 440, the client 102 determines whether it has finished using the component. If the user has not exited or closed the component, the client 102 has not finished using the component and, at step 450, continues to use the component. If the user has closed or exited the component, the client has finished using the component, either after step 440 or step 450, the client proceeds to step 445, when the client 102 automatically deletes all script 134 and script specific PDSs from the client short term memory 132.

Typically, when the client 102 receives script from the server 108 comprising of the parameter information, the client links the parameter information to the corresponding predefined structure 143 to provide the script specific PDS. The script and script specific PDSs are stored in the client short term memory 132. After the client 102 has completed using the program, the script and script specific PDSs are automatically deleted from the client short-term memory 132. By automatically deleting the script and script specific PDSs, problems associated with programmers neglecting to deallocate memory and processors being required to periodically scan for files to delete are alleviated.

Note that, as provided above, FIGS. 3 and 4 show an embodiment of the invention applied to a client-server environment. Those of skill in the art will appreciate that the invention may also be applied to a stand alone environment. The scope of the invention is not to be limited to the embodiments shown above and is to be given its full scope according to the claims provided below.

What is claimed is:

1. A method for executing an application comprising components in a client-server environment, comprising:
    sending a request for a component from a client to a server, wherein the component comprises a script and an associated predefined structure on the server, and wherein the client and the server have same runtime engine having same functional capabilities, and wherein the runtime engine includes a linker module and a plurality of predefined structures, and wherein the script associated with the component is created for use with runtime engine at the client or the server;
    transmitting parameter information associated with the requested component by the server to the client, wherein the parameter information comprises the script associated with the requested component; and
    linking the transmitted parameter information to a corresponding predefined structure at the client using the linker module in the runtime engine residing in the client to create an executable script specific predefined structure of the requested component, wherein the predefined structure having an intended functionality of the requested component, and wherein the linking step comprises locating identifiers within the script and inserting the component data corresponding to the identifiers into the predefined structure at the client by the linker module; and
    executing the application using the script specific predefined structure of the component at the client.

2. The executing method of claim 1, further comprising searching for the requested component in the script at the server in response to the request for the component from the client.

3. The executing method of claim 1, further comprising determining an access level of a user of the client, wherein the transmitting step further comprises transmitting the parameter information based on the access level of the user.

4. The executing method of claim 1, further comprising storing the predefined structure at the client and storing a copy of the predefined structure at the server so that there is a client predefined structure and a server predefined structure.

5. The executing method of claim 1, further comprising automatically deleting the parameter specific predefined structure after the user has exited the component.

6. The executing method of claim 1, further comprising establishing a connection in response to the request for the component from the client, and the server creating a session identification number for the connection so that the client and the server can follow a connectionless protocol.

7. A system for executing an application comprising components in a client-server environment, comprising:
    a client including a client memory, and a client processor, a client runtime engine configured to reside in the client memory, wherein the client runtime engine comprises a plurality of client predefined structures associated with the components and a linker module; and
    a server including a server memory and a server processor, a server runtime engine configured to reside in the server memory, wherein the server runtime engine and the client runtime engine have same functional capabilities, and wherein the client runtime engine sends a request for a component to the server, and wherein the component comprises a script and an associated predefined structure on the server, and wherein the server runtime engine transmits parameter information associated with the requested component of the script to the client, and wherein the parameter information comprises the script associated with the requested component, and wherein the script associated with the component is created for use with the client runtime engine or the server runtime engine, and wherein the client runtime engine links the transmitted parameter information received from the server with a corresponding client predefined structure of the plurality of client predefined structures to create an executable script specific predefined structure, and wherein the predefined structure having an intended functionality of the requested component, and wherein the client runtime engine links the parameter information comprises locating identifiers within the script and inserting the component data corresponding to the identifiers into the predefined structure using the linker module, and wherein the client executes the application using the script specific predefined structure of the component.

8. The system of claim 7, wherein the client runtime engine comprises a client parser and a client execution engine, wherein the client execution engine comprises a client linker and the plurality of client predefined structures, wherein the client parser configured to instruct the client processor to search for identifiers within the parameter information transmitted by the server, wherein the client linker configured to instruct the client processor to link the parameter information to the client predefined structure to create the executable parameter specific predefined structure.

9. The system of claim 8, wherein the server runtime engine comprises a server parser and a server execution engine, the server execution engine comprises a server linker and a plurality of server predefined structures, a server predefined structure having an intended functionality corresponding to an intended functionality of a component type of a plurality of component types, wherein the component has the intended functionality of the component type, the server parser configured to instruct the server processor to search for the component in the script, the component being requested by the client, the server linker configured to instruct the server processor to link the parameter information to a corresponding server predefined structure to provide a specific predefined structure; and a server transceiver being configured to transmit the parameter information associated with the component of the script.

10. The system of claim 7, wherein client memory further comprises a client long term memory and a client short term memory, the client runtime engine being stored in the client long term memory before the client sends the request for the component of the script, wherein the client processor is configured to transfer the client runtime engine to the client short term memory when the client sends the request for the component of the script, to temporarily store the executable parameter specific predefined structure in the client short term memory, and to automatically delete the executable parameter specific predefined structure from the client short term memory when the client exits the component.

11. The system of claim 7, wherein the parameter information transmitted by the server includes identifiers associated with component information and the predefined structure includes the corresponding identifiers.

12. The system of claim 7, wherein the server creates a unique session identification number for every connection established to uniquely identify each connection and recreate the session previously established thereby facilitating a connectionless protocol.

13. An application for executing a component when a user accesses a component on a system in a client-server environment, the application comprising:

a runtime engine comprising an execution engine comprising a plurality of predefined structures and a linker, a predefined structure of the plurality of predefined structures having an intended functionality of a component type of a plurality of component types, wherein the component has the intended functionality of the component types, wherein the component comprises a script and an associated predefined structure on a server, and wherein the script associated with the component is created for use with the runtime engine and wherein when the user accesses the component:

(a) the linker instructs a client processor to link parameter information associated with the component to a corresponding predefined structure to create an executable script specific predefined structure, wherein the parameter information associated with the component is transmitted from the server to a client upon user access and stored in a client processor readable memory, and wherein the server and the client have the runtime engine functional capabilities, and wherein the parameter information comprises the script associated with user access, and wherein linking the parameter information by the client processor comprises locating identifiers within the script and inserting the component data corresponding to the identifiers into the predefined structure; and (b) the execution engine instructs the client processor to execute the executable script specific predefined structure to execute the component; wherein the runtime engine is stored in a media and the runtime is transferred to the client processor readable memory of a system including the client processor readable memory and the client processor when the media is used with the system.

14. The application of claim 13, wherein the system comprises a server, the server comprising a server processor readable memory, a server transceiver, a server processor and a server runtime engine, wherein the server runtime engine is transferred to a server processor readable memory of the system and the server runtime engine comprises a copy of the runtime engine, wherein the server runtime engine comprises a server parser and a server execution engine, wherein a user at the client requests a component from the server prior to running the component and, when the user requests the component:

(a) the server parser instructs the server processor to search for the component in the script, the script being stored in the server processor readable memory, and (b) the execution engine instructs the server processor to transmit the parameter information associated with the component of the script to the client via the server transceiver.

15. The application of claim 14, wherein the server execution engine further comprises a plurality of server predefined structures, a server predefined structure of the plurality of server predefined structures having the intended functionality of a component type of the plurality of component types, wherein the component requested by the user has the intended functionality of the component type.

16. The application of claim 15, wherein, when the client requests the component, the server execution engine instructs the server processor to create a session number and to transmit the session number to the client.

17. The application of claim 13, wherein the execution engine instructs the client processor to store the executable parameter specific predefined structure in the client processor readable memory and instructs the processor to automatically delete the executable parameter specific predefined structure from the memory after the user exits the component.

* * * * *